United States Patent
Jäger

(10) Patent No.: US 6,644,443 B1
(45) Date of Patent: Nov. 11, 2003

(54) TRANSPORTATION DEVICE, ESPECIALLY A WHEELCHAIR, WITH A BRAKING SYSTEM

(75) Inventor: Gerrit Jäger, Péry (CH)

(73) Assignee: DT Swiss AG (CH)

( * ) Notice: Subject to any disclaimer, the term of this patent is extended or adjusted under 35 U.S.C. 154(b) by 0 days.

(21) Appl. No.: 09/786,029

(22) PCT Filed: Jan. 20, 1999

(86) PCT No.: PCT/EP99/00362
§ 371 (c)(1),
(2), (4) Date: Feb. 28, 2001

(87) PCT Pub. No.: WO00/12372
PCT Pub. Date: Mar. 9, 2000

(30) Foreign Application Priority Data

Aug. 31, 1998 (DE) .......................... 198 39 611

(51) Int. Cl.⁷ ................................. B60T 1/00
(52) U.S. Cl. ...................... 188/2 F; 188/31; 188/69; 188/60
(58) Field of Search .............. 188/2 F, 17, 31, 188/68, 69, 20, 60, 265, 18 R; 280/250.1, 304.1; 192/217.3, 221.1; 74/501.6, 411.5

(56) References Cited

U.S. PATENT DOCUMENTS

| | | | | |
|---|---|---|---|---|
| 865,002 A | * | 9/1907 | Viola | 188/18 R |
| 4,355,706 A | * | 10/1982 | Pan | 188/24.11 |
| 5,379,866 A | | 1/1995 | Pearce et al. | 188/2 F |
| 5,421,434 A | | 6/1995 | Liao | 188/1.12 |
| 5,570,760 A | * | 11/1996 | Lai | 188/26 |
| 5,657,836 A | * | 8/1997 | BeVier | 188/2 F |
| 6,264,007 B1 | * | 7/2001 | Norton et al. | 188/2 F |

FOREIGN PATENT DOCUMENTS

| | | |
|---|---|---|
| DE | 29511501 | 9/1995 |
| DE | 29720134 U1 * | 1/1998 |
| EP | 0684177 | 11/1995 |
| EP | 0760324 | 3/1997 |
| GB | 286411 | 3/1928 |

* cited by examiner

Primary Examiner—Jack Lavinder
Assistant Examiner—Mariano Sy

(57) ABSTRACT

The invention relates to a device for transporting human beings, comprising a frame, at least one tire extending in a peripheral direction around a wheel with a certain amount of elasticity, and a braking system. The braking power of the braking system is substantially independent from the elasticity of the tires. The invention also relates to a method for arresting said transportation device.

1 Claim, 10 Drawing Sheets

TRANSPORTATION DEVICE, ESPECIALLY A WHEELCHAIR, WITH A BRAKING SYSTEM

Figure 1:
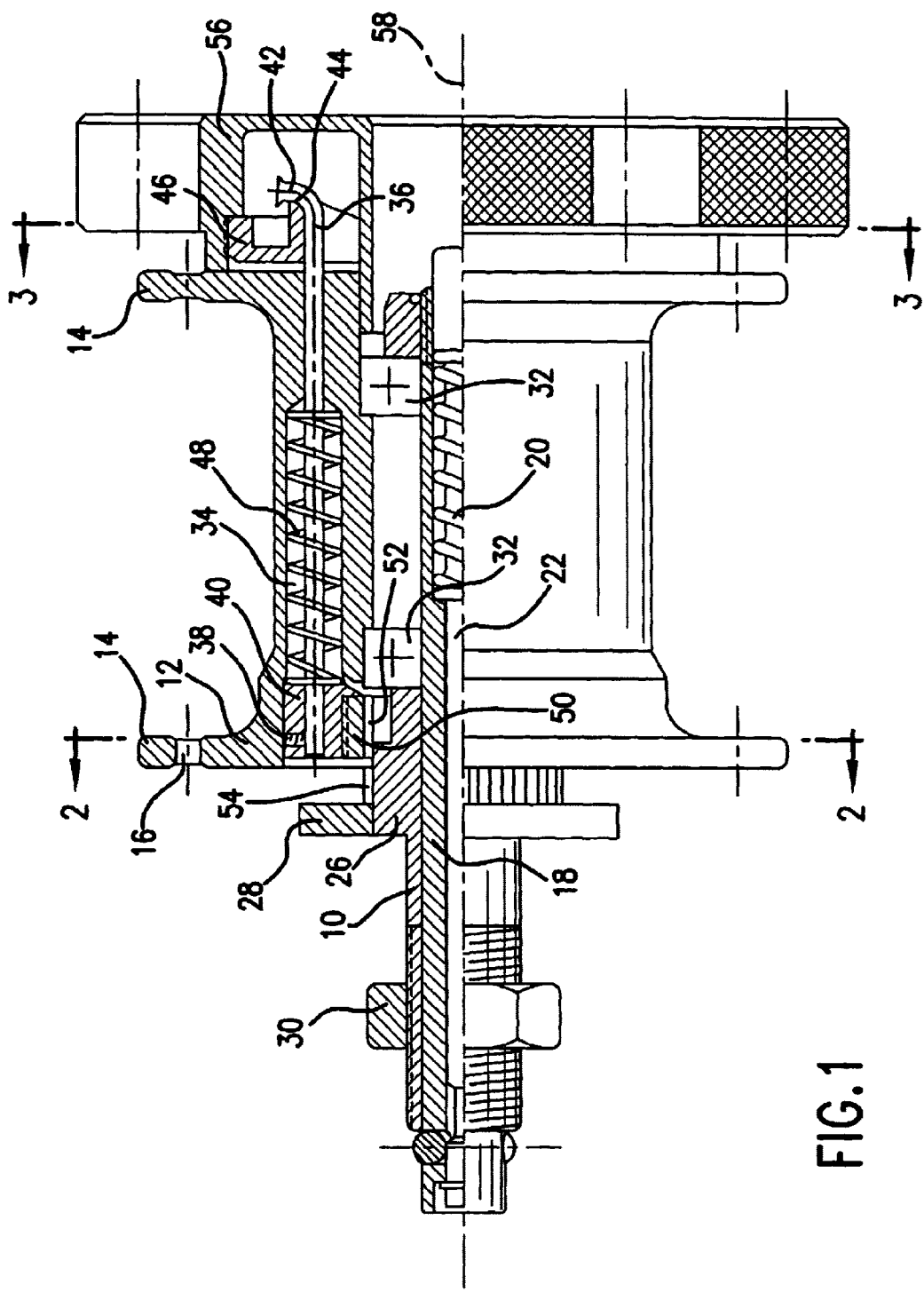

The present invention relates to a transportation device, especially a wheelchair, having a braking system comprising a locking brake, as well as a method for locking said transportation device.

The invention will be described in the following in conjunction with a wheelchair. This description should, however, not be understood in any way as a restriction to the application of the invention. On the contrary, the invention is also applicable to other transportation devices provided with wheels, etc., and having at least one rotating wheel.

A wheelchair with a locking brake is already known in which a locking force is exerted on at least one air-filled tire of the wheelchair by way of a manually actuated toggle lever such that said tire is substantially non-rotatably coupled to the supporting parts of the wheelchair.

The arrangement of such a toggle brake on a wheelchair represents a suitable measure for preventing an undesired rolling movement of the wheelchair in certain situations. For example, in many situations the rolling of a manned or unmanned wheelchair on an incline can be prevented with a set toggle brake.

However, the braking power of such a wheelchair having a toggle brake depends to a not insignificant degree on the air pressure in the tires. Thus, a toggle brake adjusted for a tire with, for example, high air pressure exerts a lower braking force on the wheelchair when the tires actually have a lower air pressure. There is obviously a considerable degree of danger inherent in such diminished braking power. Especially if the wheelchair is manned, there is a danger that a user can inadvertently put his wheelchair into motion, which can result in a situation where the wheelchair user, not expecting this rolling movement, is not in command of the traffic situation or does not have sufficient control over the wheelchair and crashes.

Since those in wheelchairs are generally restricted in the ability to move their limbs, such a crash can cause significant injuries to the wheelchair user, which in particular is also due to the fact that the wheelchair user, restricted in his mobility, cannot necessarily support himself to a sufficient extent. In an unfavorable situation, there is the danger that a crash could occur with another user of the road. Thus, for example, the known wheelchairs with toggle brakes do not rule out a situation in which the wheelchair—manned or unmanned—rolls into a street and is struck there by a moving vehicle. In addition to any material damage, other road users could also suffer physical injuries.

Consequently, the task of the present invention is to provide a transportation device for bodies, such as a wheelchair, which has a simple construction and can be manufactured economically and having a brake such as a parking or locking brake which ensures a high degree of traffic safety based on high braking reliability being independent of uncontrollable operational parameters of the transportation device.

This task is solved in accordance with the present invention by a transportation device for bodies according to claim 1.

The inventive method for locking a transportation device is the object.

Preferred embodiments of the invention constitute the subject matter of the subclaims.

The present invention thus provides for a transportation device for bodies having a braking system in which the braking force exerted is essentially independent of the elasticity of the tires of said transportation device.

The braking system preferably comprises a lockable braking means and provides for same as an especially preferred embodiment.

Since tire elasticity can be, for example, a contingency based on the fact that the tires are filled with air, respectively that the tires comprise an air-filled tube, the braking power according to the present invention is preferably essentially independent of the air pressure within the tube.

The transportation device, for example a wheelchair, a bicycle trailer, a tricycle, a Kettcar (push-pedal chain gear operated vehicle) or the like, comprises a frame means. The term "frame means" is to be broadly interpreted here and includes in particular a tubular construction or any other such related supporting construction. A receiving means for receiving a body is integrated directly or indirectly into said frame means. A body is, for example, an inanimate object or a human body.

At least two moveable wheels are opposingly arranged on the frame means. These wheels, supporting for example a tire which is preferably an outer casing-tube arrangement, have a radially inward situated hub disposed to be moveable at least intermittently relative the frame.

At least three wheels are preferably provided; at least four are particularly preferred. Preferable in this case is that some of said wheels comprise the above-mentioned hub. Especially preferred are all of said wheels having the above-mentioned hub.

An axle is disposed situated concentrically inside the hub, arranged concentrically around a central axis. Said axle preferably projects out from the hub; especially preferable is the axle running through the hub such that it axially projects out of same at both hub ends.

It is preferable for one axle to extend into at least two hubs; especially preferred is that each hub is allocated to just one axle.

Said axles are at least partially fixedly arranged relative the frame means. Preferably, the axles are supported directly and/or indirectly on the frame means at both sides of same. Especially preferred is the one-sided, meaning unilateral, supporting of the axles directly and/or indirectly to the frame means.

Especially preferred is the disposing of at least one bearing, such as a radial bearing and/or axial bearing and/or radial-axial bearing or the like, between the axle and the hub.

The transportation device further has a gearing means for receiving a signal for the triggering or terminating of at least one braking and/or locking procedure. The term "signal" is to be understood here in a broad sense. A signal in the sense of the present invention is, for example, a torque or a force, a pivotal or a helical movement. The signal is preferably of mechanical or hydraulic type. Especially preferred is an electrical or electromagnetic or pneumatic signal. Preferably, this signal is initiated by a Bowden cable and/or a rotary knob and/or a control lever and/or an eccentric means.

According to a preferred embodiment of the present invention, the braking system has at least a first and at least a second contact surface area. The first contact surface area is at least intermittently essentially non-rotatably coupled relative the central axis with a wheel. The second contact surface area is at least intermittently essentially non-rotatably coupled relative the central axis with the frame. It is hereby preferred that at least one of the above-cited non-rotatable couplings be released when the brake is in an unlocked position. It is especially preferred that the non-rotatable couplings are also in place when the brake is in a released position.

Said contact surface areas are distinguished in that they at least partially position upon one another upon an actuated brake and/or locking brake.

Preferable is having at least one of said contact surface areas being arranged moveable relative the wheel, respectively relative the frame, thus for example axially displaceable. Especially preferred is that at least one of said areas is arranged fixedly relative the wheel, respectively frame.

It is preferred to reduce the existing torque difference between the wheel and the frame with respect to the central axis when the first contact surface area is non-rotatably coupled to the wheel and the second contact surface area is non-rotatably coupled to the frame relative the central axis and these contact surface areas are in at least partial contact with one another.

Especially preferred is the preventing of a torque difference between the wheel and the frame with respect to the central axis when the first contact surface area is non-rotatably coupled to the wheel and the second contact surface area is non-rotatably coupled to the frame relative the central axis and these contact surface areas are in contact with one another. Especially preferred is the torque difference between the frame and the wheel in the above-described engagement relationships then being almost at zero when, for example, an external torque is applied to the wheel which is less than a predetermined ceiling torque.

According to an especially preferred embodiment of the present invention, this ceiling torque is adjustable. The ceiling torque, which is fundamentally adjustable to any value desired can, for example, be dependent upon material parameters, the design of individual or several components, a compressive force applied to the contact surface areas, etc.

According to a preferred embodiment of the invention, the respective contact surface areas are disposed external the tire. In this context, "external the tire" is to be understood as that none of the contact surface areas are arranged on the tire. The wheel preferably has a rim which is connected to the hub by means of, for example, an arrangement of spokes. It is hereby especially preferable that the contact surface areas are arranged external the rim. The term "external" is to be understood here as in the above-described sense.

According to a particularly preferred embodiment of the present invention, the braking system and/or the locking brake means is arranged at least partly within the hub. For example, the braking and/or locking brake means is arranged radially inside of the radially outward situated contour of the hub. Arranging the braking and/or locking brake means radially inside of the radially inner situated contour of the hub is also especially preferred.

In accordance with a particularly preferred embodiment of the present invention, the contact surface areas are arranged radially inward the radially inner and/or radially outer situated surface contour of the hub walling.

"Inside of" is hereby preferably to be understood as that the axial position of the braking system and/or the locking brake means and/or the contact surface area is not restricted. Especially preferred when interpreting "inside of," however, is that the braking means and/or the locking brake means and/or the contact surface areas is/are also arranged axially inside the hub at least partially, preferably completely. It is preferred in an embodiment that the braking system and/or the locking brake means and/or the contact surface areas be arranged at least partially—completely is especially preferred—inside a (fictitious) cylindrical region which extends about the central axis and where the radius of same is defined by the distance between the central axis and the maximum radially external point of the hub.

As an example, this point is a point arranged radially external on a radially extending flange of the hub. Such a flange is disposed with, for example, holes for the reception of spokes.

Another embodiment enables parts of the braking system and/or the locking brake, respectively parts of the contact surface areas, to have a greater radial spacing from the central axis than the point of the hub having the greatest radial distance from the central axis.

In an especially preferred embodiment of the present invention, the braking system and/or the locking brake means and/or the contact surface areas is/are at least partly arranged directly between the axle and/or a first intermediate means connected with the axle at least intermittently essentially non-rotatable relative said central axis and the hub and/or a second intermediate means connected with the hub at least intermittently essentially non-rotatable relative the central axis.

To give an example, elements are thus arranged between the hub and the axle which allow the realizing of a non-rotatable connection between the frame and the wheel; said elements are hereby not incorporated in the frame and/or the areas of the wheel which lie external or outside of the hub.

Especially preferred is the arranging of a contact surface area on the hub and/or a contact surface area on the axle.

It is also preferred that the braking system and/or the locking brake means and/or the contact surface area is/are axially arranged at least partially, preferably completely, external the hub.

According to an especially preferred embodiment of the invention, the first contact surface area is arranged on at least a first element and the second contact surface area is arranged on at least a second element which differs from said first element. Particularly preferred is that these elements, these contact surface areas respectively, can be coupled at least partly by means of a frictional contact connection such that said first element is essentially non-rotatably coupled to the second element upon actuated locking brake, respectively the torque difference between- the first and the second element is reduced upon actuated braking means.

Preferably a cone-shaped, respectively a tapered cone-shaped inner surface arranged on the first and/or second element engages in a cone-shaped or a tapered cone-shaped outer surface arranged on said first and/or second element.

Especially preferred is that said cone-shaped or tapered cone-shaped surfaces are disposed such that their rotational axes are arranged substantially parallel to the central axis.

It is also especially preferred that the contact surface areas extend at least partially substantially circumferentially relative the central axis.

Also preferred is an arrangement of the contact surface areas in a plane perpendicular to the central axis.

Especially preferred is that the first element form-fit interlocks with the second element by way of the contact surface area so that the first element is essentially non-rotably engaged with the second element upon setting the locking brake.

A non-rotatable coupling between the wheel and the frame is hereby realized when the locking brake is set by means of, for example, an intermeshing gearing arrangement. Said gearing arrangement comprises, for example, an external and an internal gearwheel, wherein upon setting the locking brake, one of said gearwheels engages non-rotatably with the wheel and one of said gearwheels engages non-rotatably with the frame.

The gearing arrangement can, however, also comprise more than, for example, two gearwheels or toothed rings.

The gearing arrangement may thus be realized such that when the locking brake is set, a first gearwheel is non-rotatably engaged with the wheel and a second gearwheel is non-rotatably engaged with the frame, wherein a simultaneously engaging shift ring in one of the gearings serves to prevent a relative rotational motion of said gearwheels.

Especially preferred is also that the first and/or the second element has at least one profile projection and the first and/or the second element at least one profile cavity, wherein said at least one profile projection engages respectively into one profile cavity when the locking brake is set so that the first element is non-rotatably coupled relative the second element.

According to a preferred configuration of the present embodiment, the profile projections are formed in the shape of cones or tapering cones, wherein the corresponding profile cavities are essentially formed as contrasting female contours to said profile projections.

This allows for quickly realizing a simple and reliable non-rotatable connection between the wheel and the frame.

According to a particularly preferred embodiment of the present invention, at least one part of said first element with said first contact surface area and/or at least one part of said second element with said second contact surface area is arranged to be axially displaceable relative the central axis at least partially and/or at least intermittently.

It is also further especially preferred that at least one part of at least one of said elements is arranged to be radially displaceable relative the central axis at least partially and/or at least intermittently.

It is preferred that at least one part of said first element with said first contact surface area and/or at least one part of said second element with said second contact surface area is arranged to be circumferentially displaceable relative the central axis at least partially and/or at least intermittently.

It is also preferred to arrange a transfer means between the gearing means and the contact surface areas. Said transfer means converts the signal introduced in the gearing means into a regulated variable for the contact surface areas.

It is particularly preferable that said transfer means is disposed with at least one forced control setting means. This can be realized, for example, in that a spring-loaded means, such as a spoke with a bent end, abuts against a surface profile having an element rotatably arranged thereupon. Upon a corresponding turning movement of said element, the spoke with its bent end shifts axially in correspondence to the current surface structure of the element at the location of the spoke so that the spoke displaces axially in accordance with the surface profile.

According to the present invention, the (switching) signal introduced in the gearing means—preferably from outside—can, in principle, be of any type. Said signal—of essentially any type—is convertible by the transfer means into a regulating signal preferably of essentially any type.

The switching signal is, for example, a torque and/or a force substantially parallel to the central axis, and/or a force substantially perpendicular to the central axis, and/or a pivoting motion which, for example, can be executed about an axis perpendicular to the central axis, and/or a helical-like motion. This signal may be introduced as, for example, a tractive force or as a compressive force. The signal is introduced, for example, mechanically, pneumatically, hydraulically, electrically or electromechanically.

The switching signal ensuing from one of said signals—respectively from a combination of said signals—is converted by the transfer means into, for example, a regulating signal so that a force substantially parallel to the central axis, and/or a force substantially perpendicular to the central axis, and/or a torque and/or a torque modified with respect to its direction or orientation, and/or a force modified with respect to its direction or orientation, and/or extending in an at least partially radial field relative the central axis.

In addition, this regulating signal itself—as far as it represents a force—is also, for example, a tractive or a compressive force. The regulating signal is furthermore of, for example, the mechanical, electrical, electromagnetic, pneumatic or hydraulic type.

It is also preferred that the transfer means has at least two axially displaceable elements disposed opposite one another and in contact with one another at least intermittently, and having cone-like or (tapered) conical surfaces to divert a direction of force. Such an arrangement as comprised by the transfer means enables, for example, that a force directed parallel to the central axis is converted to a force directed perpendicular to the central axis and/or is deviated. A conical configuration to said tapered surfaces allows—especially when a cone-like outer ring is of multi-sectioned configuration—the generating of, for example, a radial field of force in fundamentally differing radial directions from a force directed parallel to the central axis.

According to an especially preferred embodiment of the present invention, the transfer means is disposed with a spring element for the biasing of the braking means toward a closed position and/or an open position. A spring element of this type enables the contact surface areas which have shifted as a result of actuation of the gearing means, to automatically shift back to their original position upon a rebound movement of said gearing means. The spring element is thus, for example, arranged or pre-tensioned such that the contact surface areas shift to a brake closed position upon actuation of the gearing means and automatically proceed back to a brake opened position upon the rebound movement of the gearing means—respectively, they return to their original position. It is also particularly preferred for the transfer means to comprise a plurality of cylindrical segment-like shells arranged essentially circumferentially which are stressed in radially inward and/or radially outward directed orientation by a spring element disposed inside of or external said shell arrangement. This enables, for example, the cylindrical segment-like shells to be displaced outwardly from the force directed radially outwardly and then to shift back to their original position following the release of said force due to the effect of the spring force.

It is also preferable for the transfer means to comprise a cylindrical element slotted on at least one circumferential location. Due to, for example, the force of a spring or an O-ring, the element is retained in an essentially closed position. Upon a force being introduced radially from the spring, the cylindrical element widens so that its outer diameter is enlarged.

In accordance with a preferred embodiment of the present invention, the transfer means comprises at least one free wheel element; two counter-rotating shifted free wheel elements is especially preferred. The locking brake can be set via said free wheel elements—particularly preferably in conjunction with said previously-cited slotted ring.

In a preferred embodiment of the present invention, the gearing means is at least partly configured as an eccentric means, for example as an eccentric selector fork. Said eccentric means comprises, for example, an end portion at which a hole is disposed. Said hole is such arranged, for example, that its center is disposed essentially outside of the longitudinal axis dividing the width dimension in the area of the hole into two uniformly-sized sections. It is also preferred that the spacing between the center of the hole and the longitudinally proximate end of the gearing means deviates by at least one spacing measure which is essentially defined by the center of the hole and a lateral boundary aligned substantially perpendicular to the longitudinal axis of the gearing means. The eccentric member is preferably arranged such that the eccentric hole is positioned essentially over a pin in a first component and comes into contact with a second component on an externally situated contact surface. Particularly preferred is the urging of said second component—for example, via a spring-loaded action—against said gearing means. The gearing means—which preferably displays a constant profile such as a circular or elliptical profile at its end section—displaces said first component relative said second component upon a pivotal motion directed about the pin mounting. As a result, an axial force can, for example, be introduced into the transfer means.

Also preferred is that the gearing means, for example a control lever or an eccentric means, turns essentially synchronously with the wheels upon release of the locking brake and a rolling transportation device, such as a wheelchair. This allows the avoiding of a situation in which the user of said transportation device attempts to operate the locking brake while said transportation device is in motion.

Additionally preferred is that the transportation device comprises a latching means for setting the brake in at least one position.

In accordance with an especially preferred embodiment, the transportation device further comprises a free wheel or a double free wheel.

Using aluminum for manufacturing the gearing means and/or the hub and/or the axle and/or the shift ring and/or the threaded ring is preferred. Particularly preferred is the manufacturing of other—some or even all—structural members out of aluminum.

With all of the previously described embodiments and configurations of the present invention, it is feasible for the braking system to be retrofitted onto an essentially conventional hub. This has the significant advantage that the user can outfit individual wheels according to need.

The task is further solved by the inventive method.

In a method for locking a transportation device, the present invention thus provides the measure of implementing a direct and indirect generation of an essentially non-rotatable connection between a frame and a hub at a position situated external a tire and/or a rim. Said connection is preferably created within the hub.

According to an especially preferred embodiment of the present invention, a method for locking a transportation device is provided.

It should be pointed out that any given combination with respect to the interaction of the individual inventive features is preferred. In particular, the feature combinations disclosed in the independent claims are also preferred even upon omission of one or several respective features.

Furthermore, reference is herewith made to the fact that embodiments of all known arrangements unrelated to specific printed publications are principally known to the applicant, respectively inventor, so that the inventor also reserves protection for same should same not also be publicly known.

It is readily apparent to an expert that there are a number of further feasible modifications and configurations beyond the examples of embodiments of the present invention given herein of which the present invention cover. The invention is in particular not limited to the embodiments as given herein.

Figure 2:
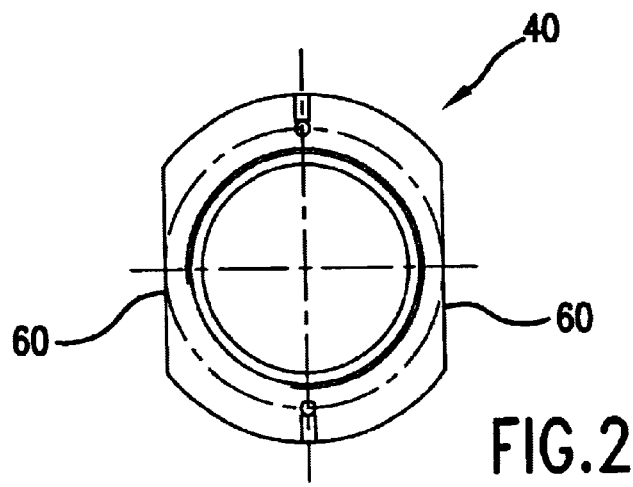
Figure 3:
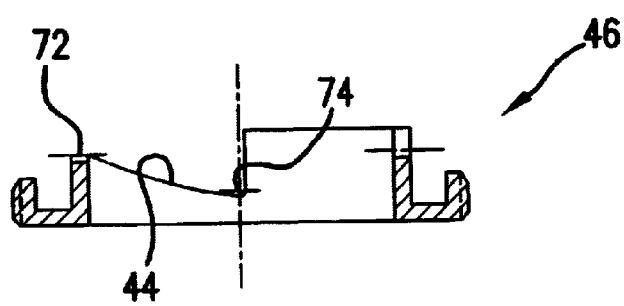
Figure 4:
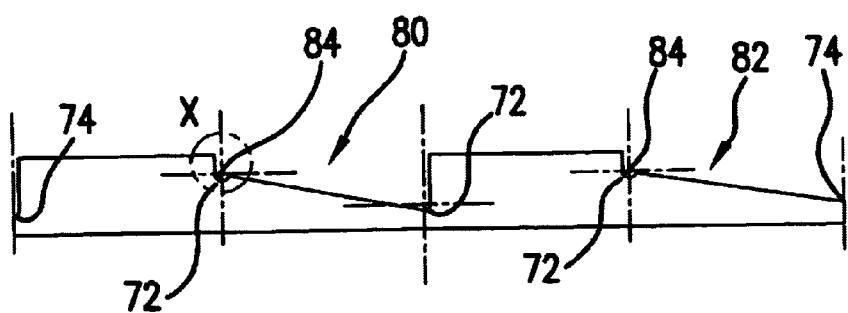
Figure 5:
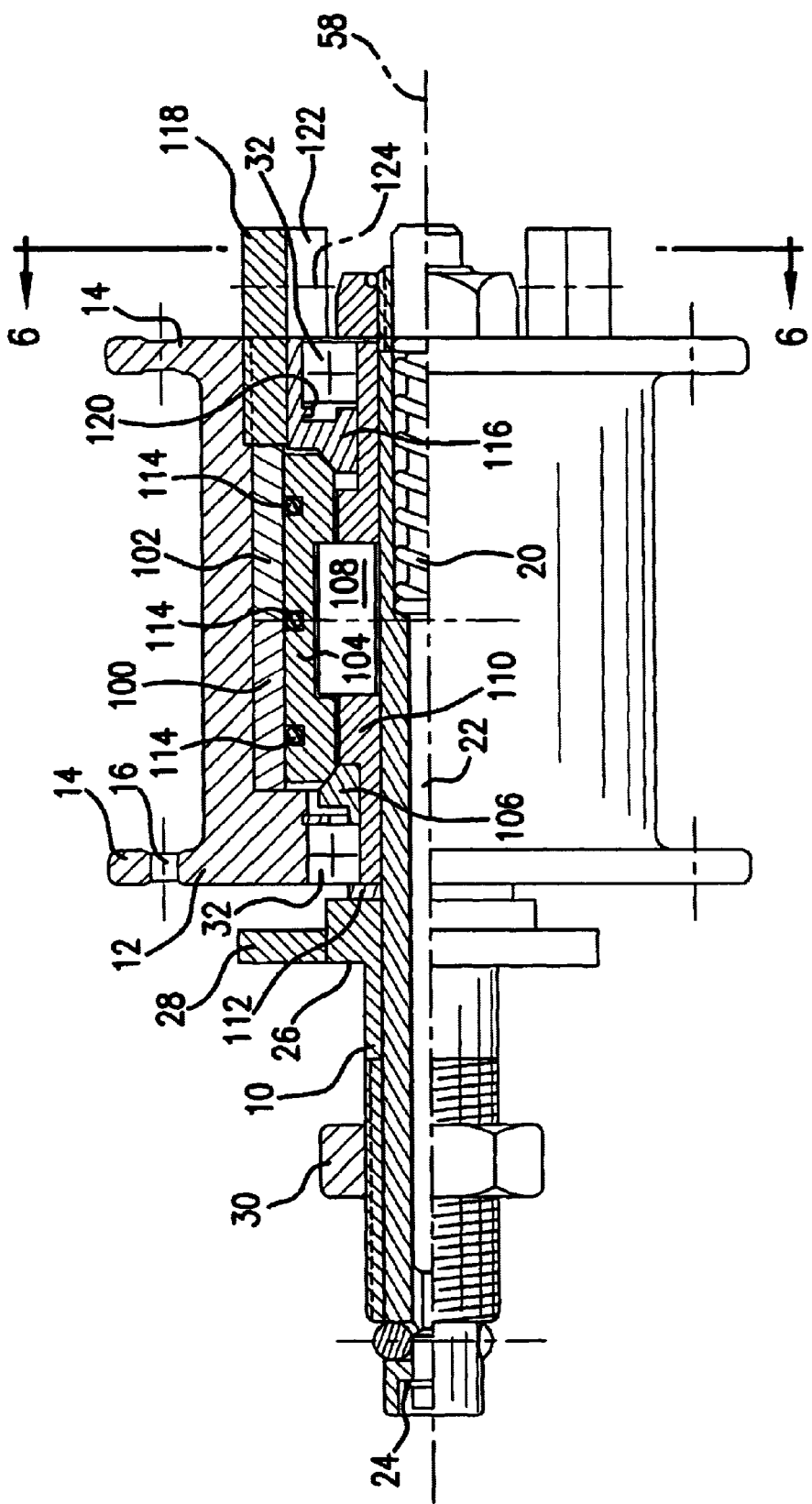
Figure 6:
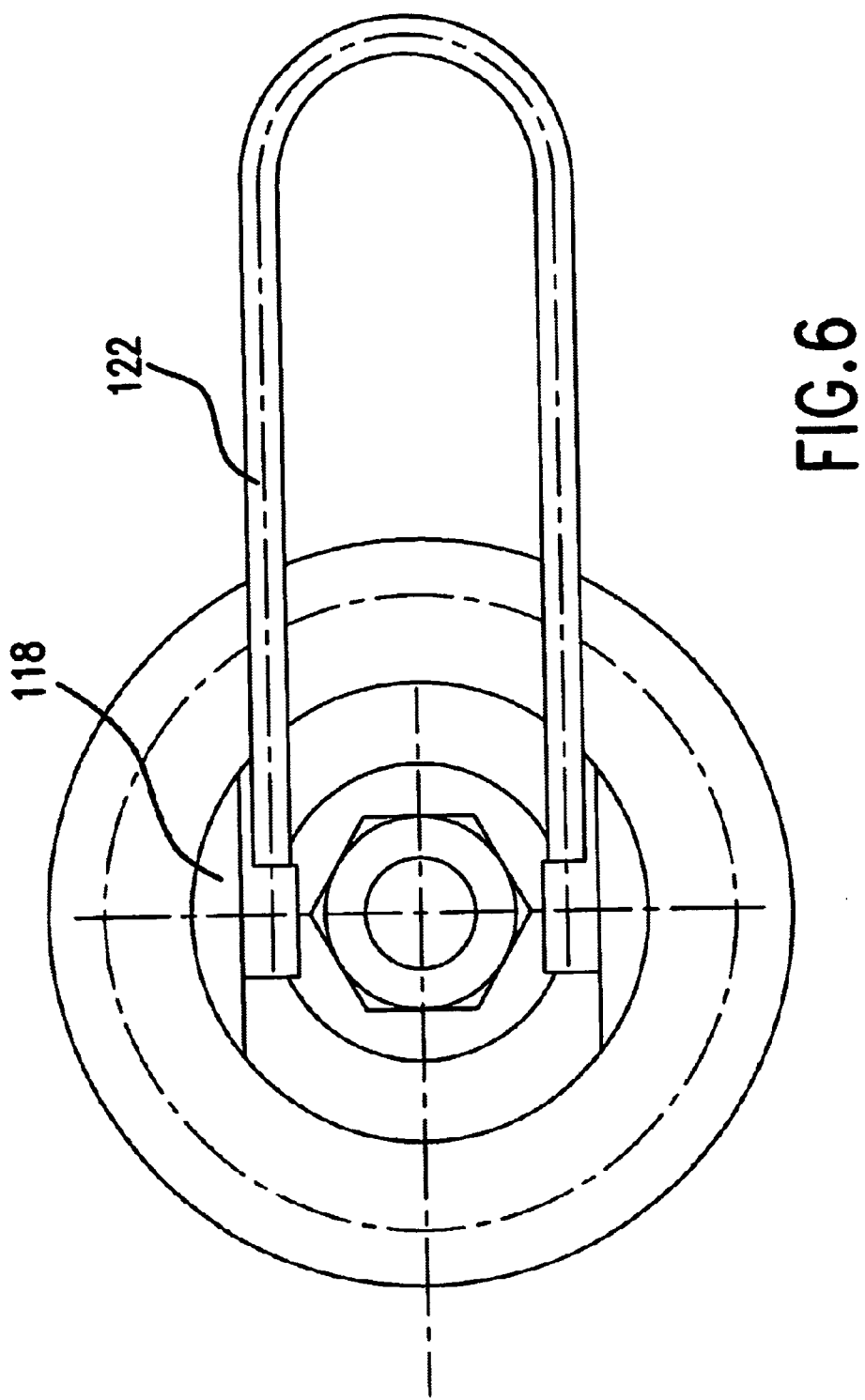
Figure 7:
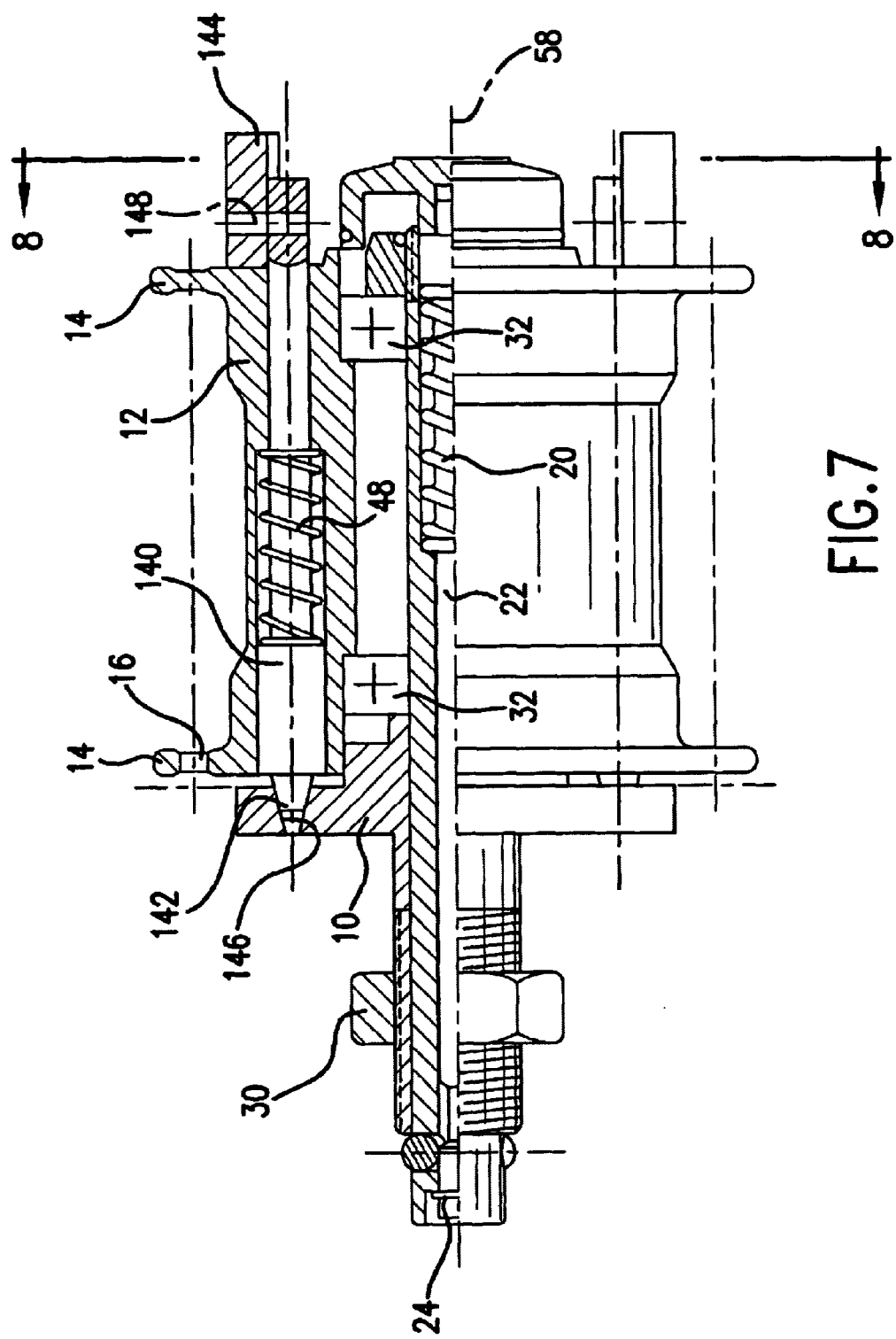
Figure 8:
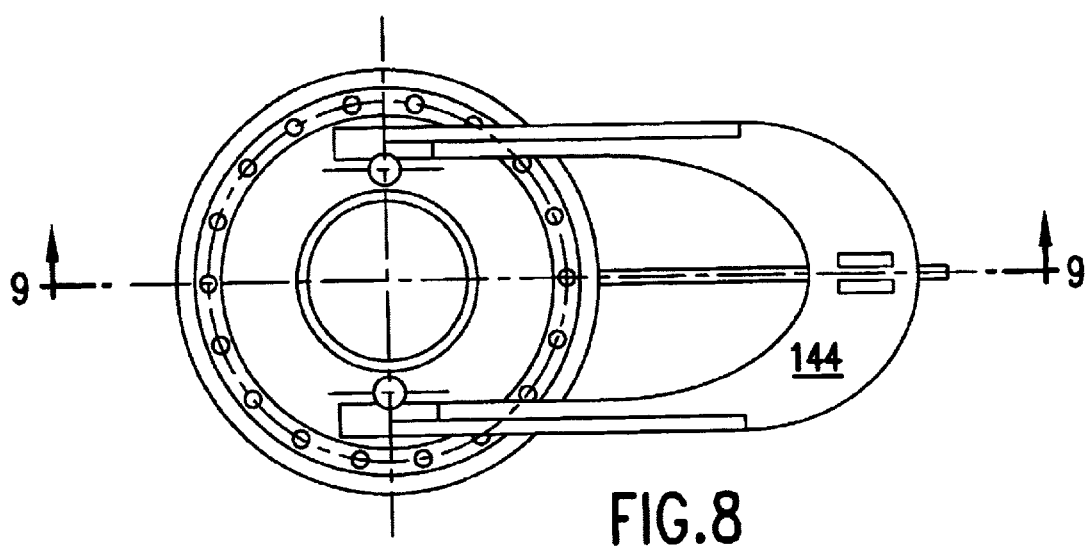
Figure 9:
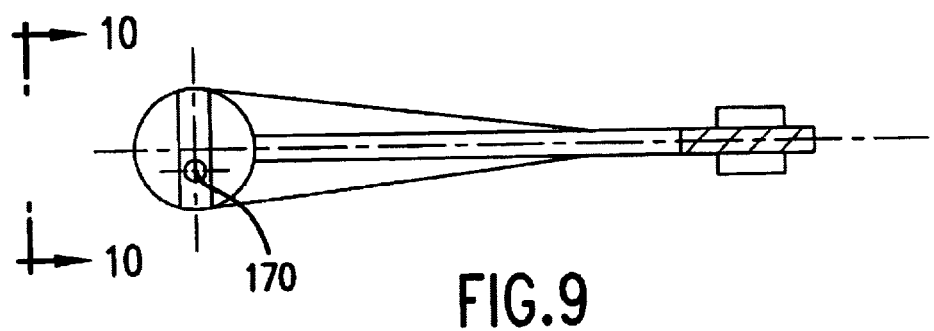
Figure 10:
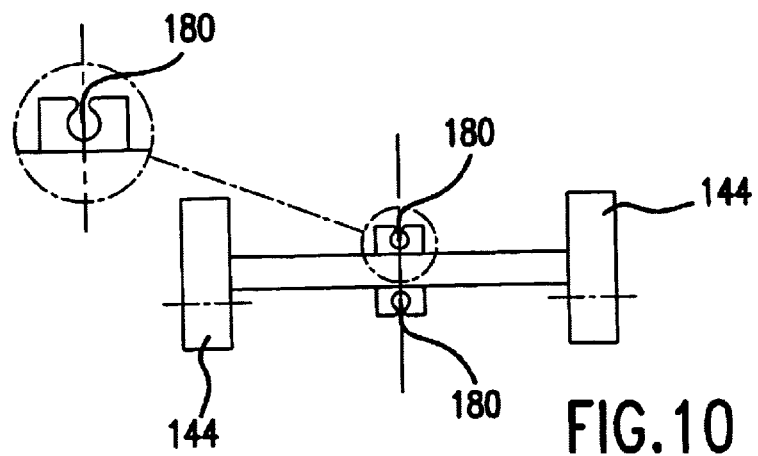
Figure 11:
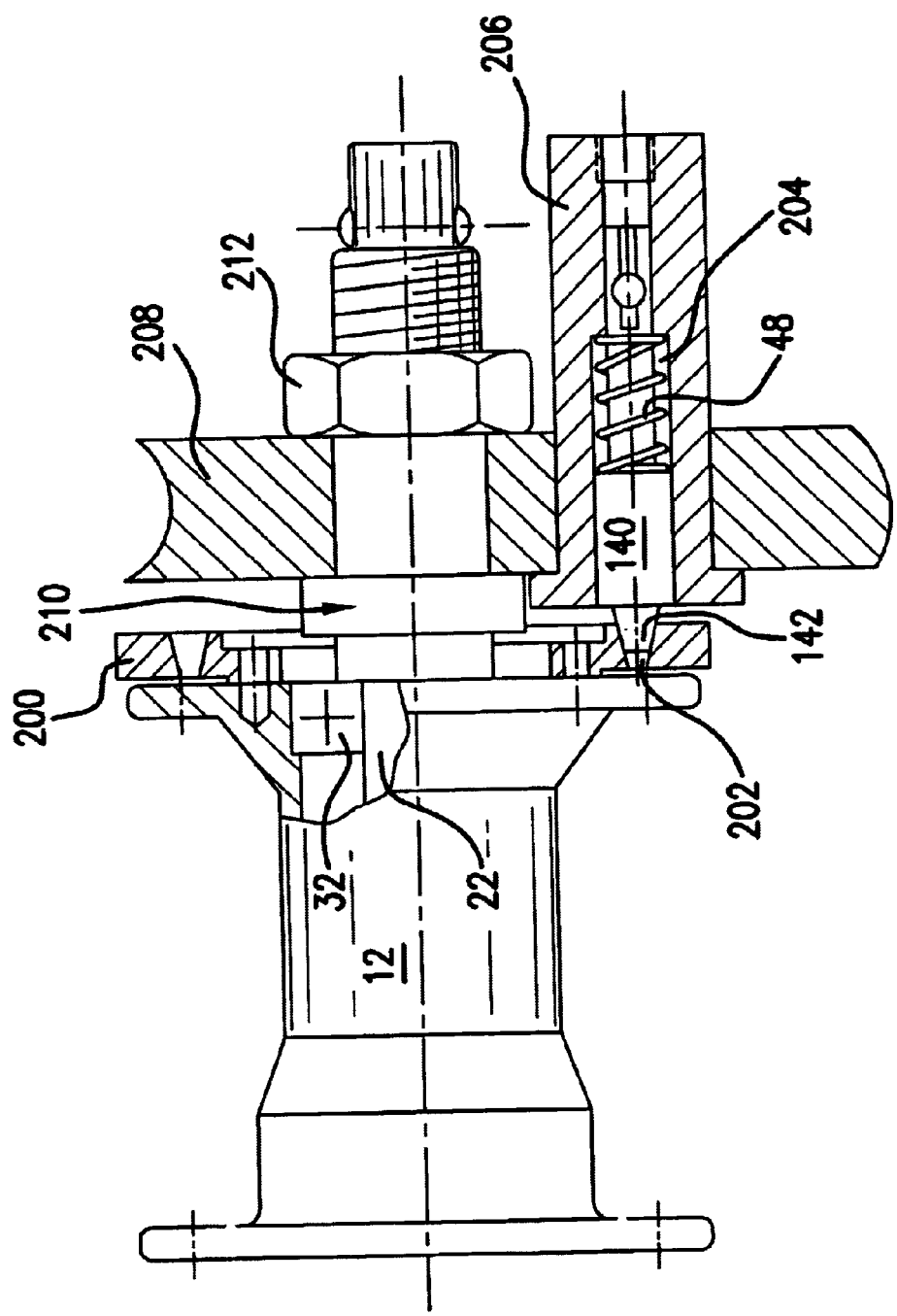
Figure 12:
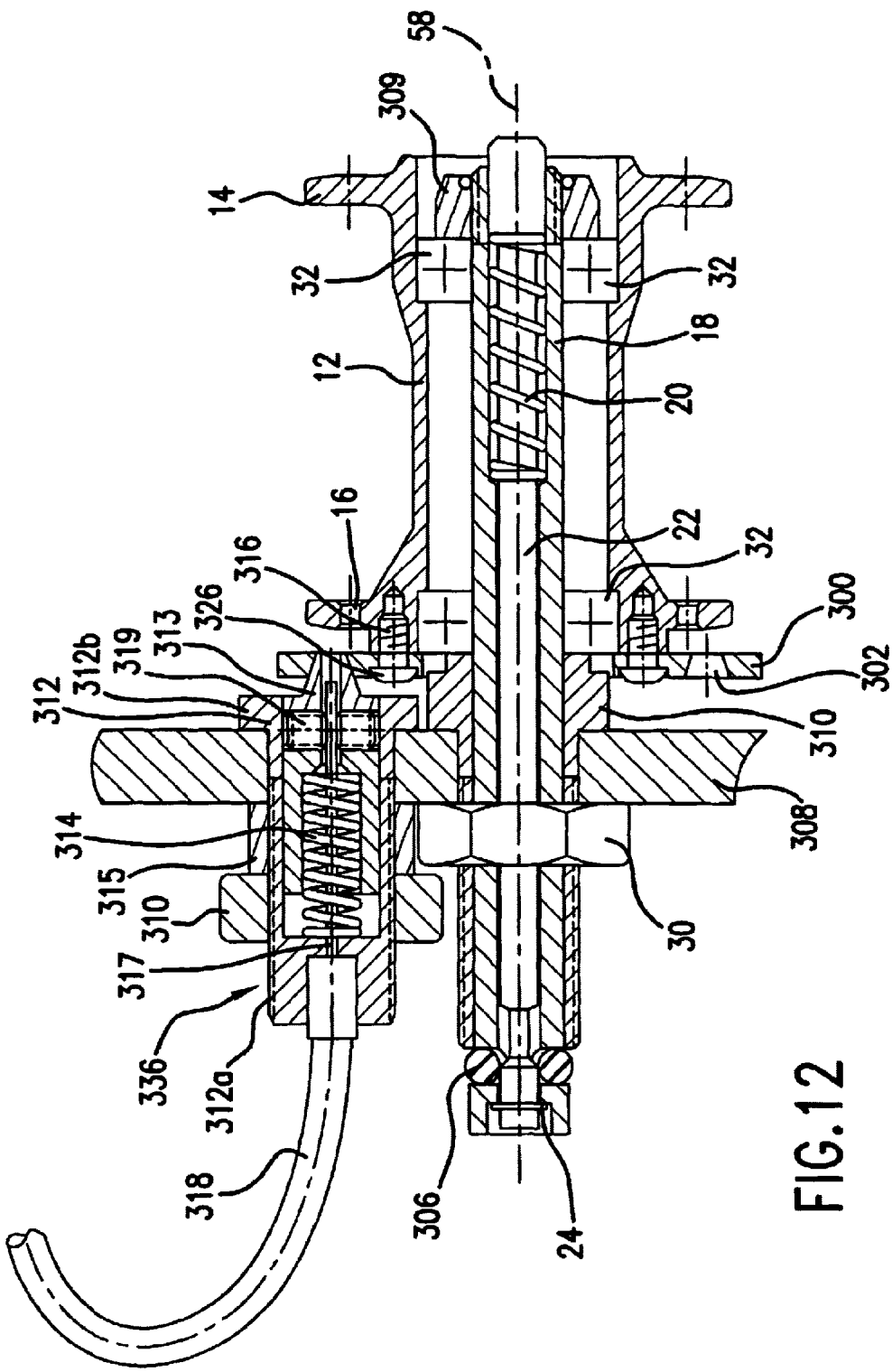
Figure 13:
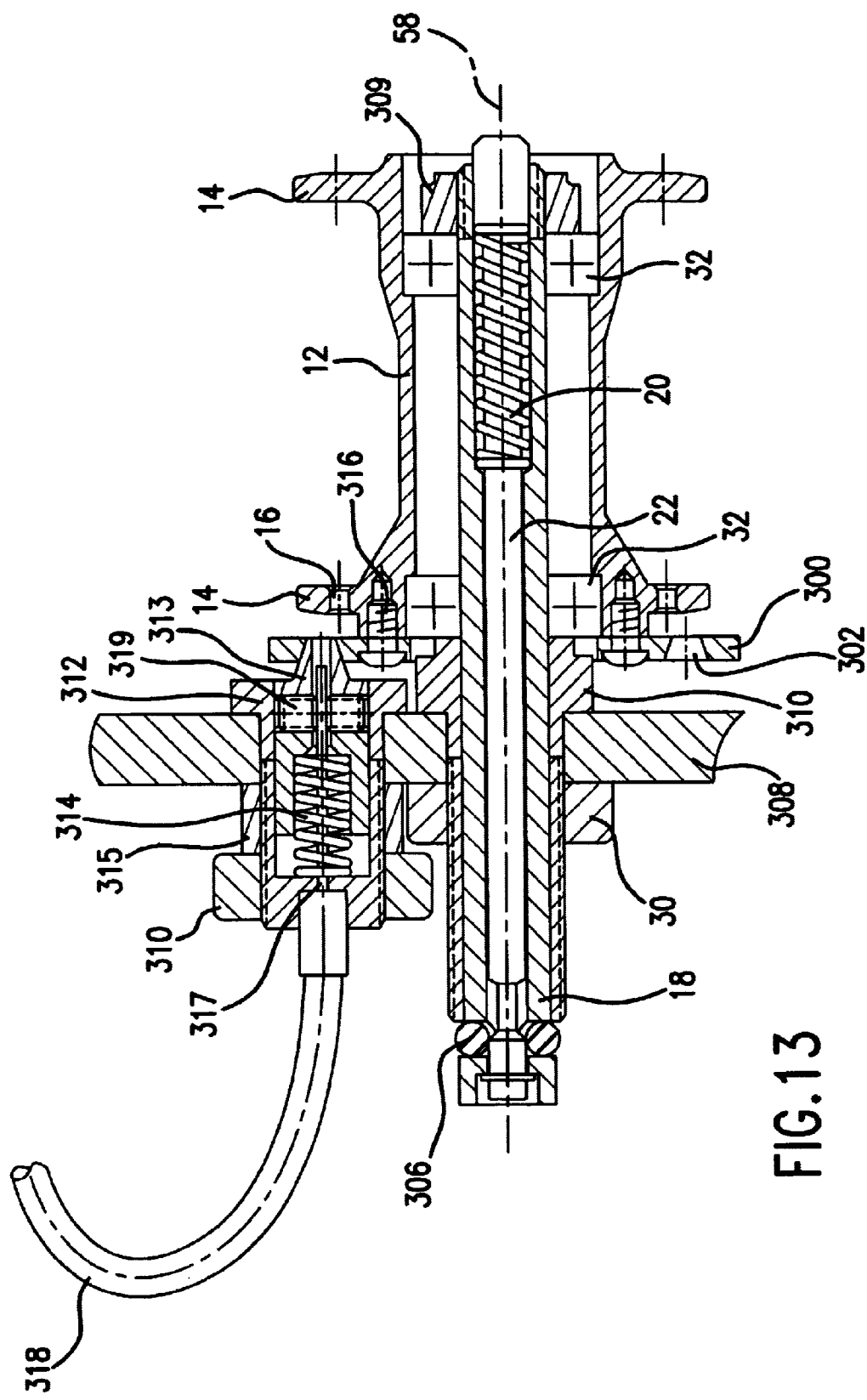
Figure 14:
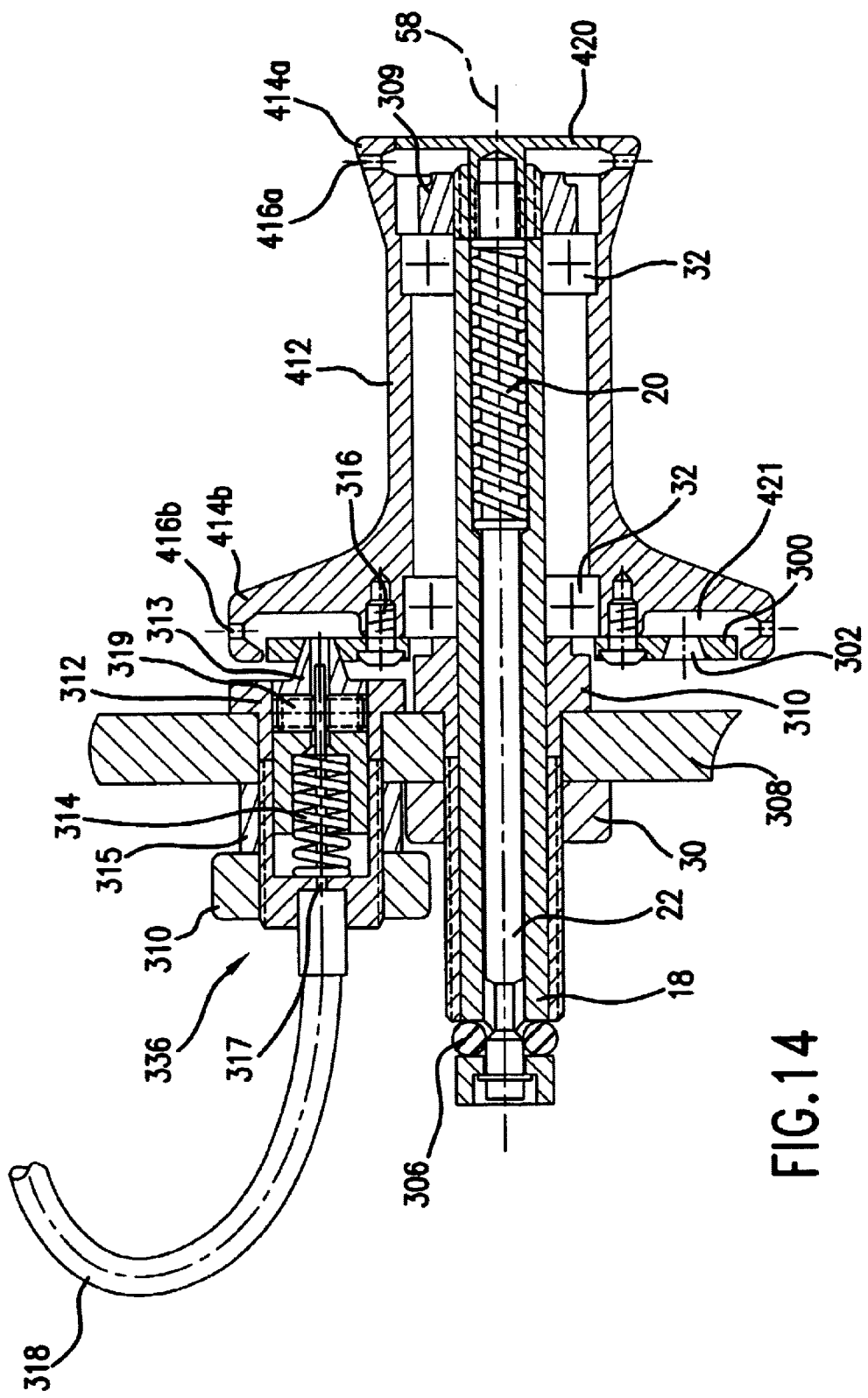

The invention will now be described in greater detail in the following using exemplary non-restrictive embodiments, which show:

FIG. 1 a partial detail view of a first exemplary embodiment of an inventive wheelchair having a braking system;

FIG. 2 a partial sectional view along the 2—2 line from FIG. 1;

FIG. 3 a partial sectional view along the 3—3 line from FIG. 1;

FIG. 4 the partial sectional view according to FIG. 3 in a distended representation;

FIG. 5 a partial detail view of a second exemplary embodiment of an inventive wheelchair having a braking system;

FIG. 6 a partial sectional side view along the 6—6 line from FIG. 5;

FIG. 7 a partial detail view of a third exemplary embodiment of an inventive wheelchair having a braking system;

FIG. 8 a partial sectional side view along the 8—8 line from FIG. 7;

FIG. 9 a partial sectional view along the 9—9 line from FIG. 8;

FIG. 10 a partial sectional view along the 10—10 line from FIG. 9;

FIG. 11 a partial detail view of a fourth exemplary embodiment of an inventive wheelchair having a braking system;

FIG. 12 a sectional view of a fifth embodiment of the hub of the braking system of an inventive wheelchair;

FIG. 13 a sectional view of a sixth embodiment of the hub and the braking system of an inventive wheelchair; and FIG. 14 a sectional view of a seventh embodiment of an inventive wheelchair having a braking system.

FIG. 1 shows a first embodiment of an inventive wheelchair hub with brake.

According to the present invention, an element such as adapter 10 is provided, arranged rotatable relative a hub, respectively a hub housing 12, when the locking brake is not actuated. Said hub housing 12 has two flange regions 14 extending essentially radially outward, with a plurality of holes 16 distributed across the circumference of their end sections. Said holes preferably serve to receive spokes (not shown). Said spokes serve to connect said hub housing 12 with a rim (not shown) for supporting a tire (likewise not shown), for example a tire devised as a casing around an air-filled tube.

Adapter 10 is supported by an inner radial sleeve 18. A spring element 20 supports sleeve 18 relative axle 22 arranged inside said sleeve 18. The outward axial slippage of axle 22, respectively sleeve 18, is prevented by, for example, retaining ring 24.

The (not shown) frame of the wheelchair is essentially non-rotatably bolted to the outer circumference of adapter 10, braced between an area 26 of adapter 10 and/or locking plate 28 and nut 30 bolted to the outer circumference of adapter 10. Adapter 10, respectively sleeve 18, is disposed—upon non-actuated locking brake—essentially rotatable relative hub housing 12 by means of bearing arrangement 32.

Said hub housing 12 is perforated in essentially axial direction by at least one hole 34 preferably having different diameter ranges.

An element, such as a spoke 36, extends through said hole 34, fixed at one end in a guide nut 40 arranged non-rotatably and axially displaceable relative said hub housing 12 by means of a threaded pin 38. The other end of spoke 36 extends toward the gearing means.

The angled end 42 of spoke 36 comes into contact with a surface profile 44 of shift ring 46.

A pressure spring means 48, arranged between hub housing 12 and guide nut 40, induces a tractive force on spoke 36 such that said spoke 36 essentially positions against said surface profile 44 of said shift ring 46. Said guide nut 40 is bolted to a threaded ring 50 at its radially inward situated end. Said threaded ring 50 is disposed with gearing 52 on its radially inward situated surface.

In the event of an axial displacement of spoke 36, respectively guide nut 40, respectively threaded ring 50, gearing 52 moves over gearing 54 of adapter 10 so that hub housing 12 is essentially non-rotatably coupled with the not shown housing, respectively frame.

This axial movement triggering arresting of the locking brake means may be induced by a rotational motion, respectively introducing torque to rotary knob 56. Said rotary knob 56 is fixedly joined to said shift ring 46 via a threaded means.

Upon turning rotary knob 56, respectively shift ring 46, about the central axis 58 relative hub housing 12, surface profile 44 is displaced with respect to angled end 42 of spoke 36. Since shift ring 46 is fundamentally axially fixed, angled end 42 of spoke 36 essentially follows the surface profile 44 of said shift ring 46 due to the spring force effect of pressure spring means 48. This is synchronized with the switching operation of gearing 52 and 54.

FIG. 2 shows a view of guide nut 40 in a representation along the 2—2 line from FIG. 1.

It is clear from this view that a rotation relative hub housing 12 is prevented by the flattened area 60 of the otherwise circularly formed radial outward situated region of guide nut 40.

FIG. 3 shows the shift ring 46 along the 3—3 line from FIG. 1.

This view elucidates the surface profile 44 of shift ring 46.

Spoke 36 (not shown here) is displaceable along the surface profile 44 of shift ring 46 between a first extreme position 72, in which the locking means is essentially open to its maximum, and a second extreme position 74, in which said locking means is essentially closed to its maximum.

FIG. 4 shows the surface profile 44 of shift ring 46 in a distended form. This shows clearly that the surface profile preferably has a first area 80 for receiving a first spoke as well as a second area 82 for receiving a second spoke 36. Preferably, a cavity is provided in a first extreme position for locking spoke 36.

FIG. 5 shows a second exemplary embodiment of the present invention.

A first free wheel 100 as well as a second free wheel 102 are arranged inside the hub housing 12.

Said free wheels 100,102 are arranged counterrotatably or switched to move in counter rotations.

Upon impact of a radial force, respectively impact of a force acting across a radial force field able to be generated via slotted double-cone component 104, a non-rotatable connection is produced between hub housing 12 and the (not shown) frame, respectively housing, between the hub housing 12 via free wheels 100,102, the first cone member 106, respectively fitting key 108, the element 110, cam bushing 112 as well as adapter 10, respectively nut 30, respectively locking plate 28.

Double-cone component 104 is of substantially cylindrical configuration and comprises a continuous slot at a position along its external circumference so that it has spring-like capacity for outward load. Spring elements extend circumferentially from said double-cone element, configured, for example, as O-rings 114. Said O-rings 114 retain the slotted double-cone component in an essentially closed basic position, so that the outer circumference of said double-cone component 104 has an essentially minimum diameter.

Upon an axial displacement of said second cone member 116 counter said first cone member 106, the double-cone component moves in essentially outward radial direction, respectively widens outwardly against the force exerted by O-rings 114 on the double-cone element. As a result, the locking brake adopts the previously mentioned locked position.

The axial displacement of second cone member 116 is realized by means of swivel element 118 which is non-rotatably coupled to the second cone member via claw arm 120.

Swivel element 118 is mounted to hub housing 12 via threading. Upon a rotation of said swivel element 118 relative hub housing 12, said threading prompts a helical motion to be exerted upon said second cone member 116.

For the adjusting of said swivel element 118, a switching element 122 is coupled to same.

In accordance with a first embodiment of said switching element, same constitutes a selector fork essentially fixedly coupled to said swivel element 118 and upon which an external torque directed about the central axis 58 may be exerted.

In accordance with a second embodiment of said switching element 122, same is configured as an eccentric means. Here, the eccentric element, implemented for example as a selector fork, is eccentrically supported at its respective ends, whereby a surface of said eccentric element positions against said second cone member 116. Upon a rotation of said eccentric element about axis 124, the spacing between the bearing center of said eccentric element and said second conical element changes such that an axial movement is exerted on swivel element 118, inducing a helical movement of the threading arranged between said swivel element 118 and said hub housing 12, and thus an axial share being exerted on said second conical element.

FIG. 6 shows a sectional view along the 6—6 line from FIG. 5.

An exemplary arrangement of the switching element 122 is herein clearly distinct.

FIG. 7 shows a third exemplary embodiment of the present invention.

One end of shifter rod 140 running though hole 34 tapers to a conical end 142 and its other end contacts an end portion of the eccentric selector fork 144. Shifter rod 140 is urged toward conical end 142 by means of pressure spring element 48 arranged axially between hub housing 12 and shifter rod 140.

Openings 146 are arranged extending across the circumference of adapter 10 for receiving said conical end 142. Said openings 146 are of fundamentally conical configuration, whereby the tapering gradient corresponds essentially to the tapering gradient of said conical end 142.

The other end of the shifter rod engages with the eccentric selector fork via pin 148. The axis of the pin essentially forms the fulcrum of said eccentric selector fork.

Eccentric selector fork 144 is essentially supported against said hub housing 12. In a first shift position, the essentially circularly configured eccentric end is arranged such that the spacing between the axis of pin 148 and hub housing 12 is fundamentally small. In this shift position, conical end 142 engages into opening 146 so that rotational motion between hub housing 12 and the (not shown) housing or frame is fundamentally prevented.

In a second eccentric position, the spacing between the axis of pin 148 and the hub housing 12 is fundamentally larger, so that shifter rod 140 is essentially moved toward pin 148 counter to the effect of pressure spring means 48. In this position, conical end 142 does not engage into opening 146 so that the braking means is in an essentially released, meaning a not set or an unlocked position.

FIG. 8 shows a sectional view along the 8—8 line from FIG. 7.

The positioning of eccentric selector fork 144 can be clearly seen here.

FIG. 9 shows a sectional view along the 9—9 line from FIG. 8.

It can be readily seen from this depiction that hole 170 is arranged essentially eccentrically in eccentric selector fork for the receiving of pin 148.

FIG. 10 shows a sectional view along the 10—10 line from FIG. 9.

This view shows—in enlarged form—part 180 of a locking means as one of the parts comprising eccentric selector fork.

Said locking means enables a locking of the gearing means in a set brake position, respectively in a released position, so that this position will still be maintained in the event of possible vibrations, for example due to wheelchair motion.

FIG. 11 shows a fourth embodiment of the present invention.

Axle 22 of the wheelchair is rotatably mounted relative hub housing 12 via bearing arrangement 32.

A second intermediate means, here configured as second spacer plate 200, is non-rotatably joined to hub housing 12. Said second spacer plate is disposed with openings 202. Said openings are preferably of conical configuration and serve to receive the conical end 142 of shifter rod 140 when the locking brake is in a set position. Shifter rod 140 is directed through opening 204 of the first intermediate sleeve 206 comprised by said first intermediate means and is supported against said first intermediate sleeve by means of pressure spring element 48. The conically-shaped distal end 142 of shifter rod 140 serves to receive a switching element able to introduce a braking or setting action of the braking, respectively locking means.

The first intermediate sleeve 206 is non-rotatably coupled to the first spacer plate 208, which likewise is comprised by the first intermediate means. Said first spacer plate itself is non-rotatably braced to axle 22—here, via shoulder 210 of axle 22 as well as nut 212 screwed onto axle 22.

The first spacer plate is, for example, incorporated in the otherwise not shown frame of the wheelchair. It can however also constitute a separate element, not directly encompassed by said frame.

A fifth embodiment of the hub and the braking system of the present invention is sectionally represented in FIG. 12. A hollow sleeve 18, in which axle 22 is arranged, is supported concentrically in hub housing 12 by means of a ball bearing 32.

As is the previously described embodiments, a spring element 20 is arranged on axle 22 and any axial slippage of axle 22 is prevented by retaining ring 24 and balls 306, which are arranged on the left side (according to the orientation of FIG. 12).

A nut 30 is bolted to adapter 310 and a first spacer plate 308 is clamped between a radially thickened section of adapter 310 and nut 30. The first spacer plate 308 can be a part of the wheelchair frame or can be solidly affixed to the wheelchair frame.

Hub housing 12 further comprises two annular flanges 14 disposed with holes 16 for receiving spokes. In addition, four holes 316 are arranged in the hub housing on the left hub flange (according to the orientation of FIG. 12) on the side at which the hub sleeve projects from the hub. Said four holes 316 are aligned parallel to central axis 58 and distributed preferably circumferentially uniformly on the hub housing.

A second spacer plate 300 is arranged on the left side of the hub housing and bolted to the hub housing by means of four screws 326 through holes 316 of said hub housing.

Second spacer plate 300 comprises several tapered or conical openings around its circumference into which the conical ends 313 of the gearing means can extend.

A tension cable 317 within a cable sheath 318 leads to gearing means 336 which is arranged on a second opening in said second spacer plate 308.

Gearing means 336 is disposed with a sleeve 312 comprising an area 312b having a large diameter at one end and an area 312a having a male threading at the other end.

The threaded side 312a of sleeve 312 extends through the opening of plate 308 such that area 312b having the large diameter directly positions on plate 308 and a part of the area 312a with the male threading protrudes from the left side.

A spacer 315 is slid onto sleeve 312 to the left of spacer plate 308, which is affixed to sleeve 312 via adapter 310.

The tension cable is fed into the partially hollow sleeve.312 from the left side and led to the brake pin, respectively the conical end 313, at the right end of the sleeve. The axial position of conical end 313 can be adjusted via threaded stud 319. In comparable manner as in the previously described embodiments, a spring 314 is provided in the gearing means.

FIG. 13 depicts a further embodiment which is particularly distinguished from the embodiment represented in FIG. 12 by the dimensions of gearing means 336.

FIG. 14 depicts a further embodiment of the present invention. In comparable manner as in the previously described embodiments, this embodiment as well comprises an axle 22, a sleeve 18 arranged concentrically thereto, and a spring 20 disposed between the two. Hub sleeve 412 is rotatably mounted with respect to the hub axle via ball bearing 32.

The functional operation of gearing means 336 corresponds to the functional operation of the gearing means described in detail with reference to FIG. 12; a description of same here can thus be omitted.

In contrast to the previously described embodiments, the hub according to the embodiment with reference to FIG. 14 comprises different flanges 414a and 414b on each side of said hub housing, differing in their configured shape as well as in their dimensions. Hub flange 414b is arranged on the left side (according to the orientation of FIG. 14), meaning the side on which the hub axle 22 and the sleeve 18 protrude from the hub housing, said flange 414b extending radially farther outward than hub flange 414a arranged on the right side.

The profile of hub flange 414b extends, seen outwardly from the center of the hub, at a steep outward gradient until it reaches its maximum radial expansion, then parallel to the hub axle at somewhat greater than ball bearing width, and then slopes away again steeply to the hub axle, ending however at a smaller spacing than the ball bearing width as seen from maximum radial spacing. Thus resulting in an annular or disk-shaped clearance 421 in the left hub flange 414b.

Holes 416b are arranged along the circumference of the left hub flange 414b having maximum diameter, said holes being aligned essentially perpendicular to the hub axle. The alignment of said holes 416b can, however, also ensue at an angle of up to 10° relative a plane perpendicular to hub axis 58.

Said holes 416b serve to receive spokes on which the rim is then affixed. Such an arrangement, in which the spoke holes are aligned roughly perpendicular to the hub axle, is also known as a "straight pull." The distinct advantage of such an arrangement as herein described is that the spokes (even when employing conventional spokes) undergo a bending during their threading in which reliably and effectively prevents the spokes from twisting in the spoke holes during operation so that even conventional, respectively round, spokes can be employed. In contrast thereto, the prior art makes use of, for example, polygonal-shaped spokes in order to prevent a twisting or even disengaging of the spokes.

Another particular advantage of this alignment of bores or holes 416b with respect to hub axis 58, is that the spokes can even be subject to bending during their assembly and as a result a tension is created in the spoke which prevents same from twisting in the holes.

Three spokes are employed per hub side, respectively hub flange in the embodiment as depicted, however up to 50 spokes can be utilized as well.

The right hub flange 414a is arranged on the right side of the hub and likewise has holes for spokes 416a. The right side of the hub housing terminates in a hub end element 420, sometimes also called a push button. Said hub end element 420 is preferably made of aluminum and bolted onto the axle.

What is claimed is:
1. Transportation device for bodies, having
   at least one frame;
   at least one receiving means for receiving a body, whereby said receiving means supported against said frame;
   at least two wheels arranged at least intermittently movable relative to said frame, whereby a hub is arranged on at least one of said wheels in an essentially radially inner situated area which is at least intermittently movable relative said frame;
   at least one axle extending essentially concentrically about a central axis and arranged at least partly within said hub, whereby said hub is at least partly arranged essentially concentrically about said axle;
   a respective at least one tire extending circumferentially about each respective one wheel, whereby at least one of said tires has an elasticity;
   at least one braking means;
   at least one switching means for the receiving of a signal by means of which a braking process is triggered;
   whereby
      the braking force of said braking means is essentially independent of the elasticity of the tires;
      wherein said braking means comprises at least one locking brake means;
      wherein said braking means comprises at least a first contact surface area at least intermittently essentially non-rotatably connected with at least one Wheel relative said central axis and at least one second contact surface area at least intermittently essentially non-rotatably connected with said frame relative said central axis, whereby when said braking means is in an actuated state, said areas are at least partially fundamentally solidly coupled with one another;
      wherein said first contact surface area is arranged on at least one first element and said second contact surface area is arranged on at least one second element, which differs from said first element, whereby said first element can be coupled with said second element at least at a part of said first and second contact surface area by means of an essentially form-fit connection such that said first element is essentially non-rotatably coupled to said second element upon actuated locking brake means;
      wherein said contact surface areas each extend at least partially to a cone-shaped surface;
      wherein a transfer means is provided for transferring the signal introduced in a gearing means into a regulated variable for the contact surface areas; and
      wherein an eccentric means has at least one end section substantially facing said transfer means which is rounded and has a hole for receiving a pin, whereby said hole is arranged asymmetrical to the end section defining longitudinal axis and at a spacing from the end which is defined by at least one distance to the lateral boundary, whereby said distance extends perpendicular to the longitudinal axis and to the axis of the pin so that the axial position of one of said elements of said transfer means joining said eccentric means is adjustable from said eccentric means dependent upon the position of said eccentric means.

* * * * *